United States Patent
Stadler et al.

(10) Patent No.: US 8,899,623 B2
(45) Date of Patent: Dec. 2, 2014

(54) MOTOR VEHICLE WITH RETRACTABLE STEERING WHEEL

(71) Applicant: Audi AG, Ingolstadt (DE)

(72) Inventors: Michael Stadler, Arnsberg (DE); Ingo Schütz, Erdweg (DE)

(73) Assignee: Audi AG, Ingolstadt (DE)

( * ) Notice: Subject to any disclaimer, the term of this patent is extended or adjusted under 35 U.S.C. 154(b) by 14 days.

(21) Appl. No.: 13/950,034

(22) Filed: Jul. 24, 2013

(65) Prior Publication Data
US 2014/0028008 A1    Jan. 30, 2014

(30) Foreign Application Priority Data
Jul. 25, 2012 (DE) .......................... 10 2012 014 762

(51) Int. Cl.
| | | |
|---|---|---|
| *B62D 1/181* | (2006.01) | |
| *B62D 1/185* | (2006.01) | |
| *B62D 1/19* | (2006.01) | |
| *B62D 5/00* | (2006.01) | |

(52) U.S. Cl.
CPC ................ *B62D 1/192* (2013.01); *B62D 1/197* (2013.01); *B62D 5/001* (2013.01)
USPC .............. 280/777; 280/775; 280/731; 74/495

(58) Field of Classification Search
CPC .......... B62D 1/19; B62D 1/192; B62D 1/195; B62D 1/197; B62D 1/181
USPC .............................. 280/777, 775, 731; 74/495
See application file for complete search history.

(56) References Cited

U.S. PATENT DOCUMENTS

| | | | | |
|---|---|---|---|---|
| 5,295,712 | A * | 3/1994 | Omura .......................... | 280/777 |
| 5,618,058 | A * | 4/1997 | Byon ............................. | 280/777 |
| 5,893,580 | A * | 4/1999 | Hoagland et al. ............. | 280/731 |
| 6,170,862 | B1 * | 1/2001 | Hoagland et al. ............. | 280/731 |
| 6,227,571 | B1 | 5/2001 | Sheng et al. | |
| 7,048,305 | B2 * | 5/2006 | Muller .......................... | 280/775 |
| 7,461,863 | B2 * | 12/2008 | Muller .......................... | 280/777 |
| 7,735,405 | B2 * | 6/2010 | Parks ............................. | 89/1.14 |
| 7,862,079 | B2 * | 1/2011 | Fukawatase et al. ......... | 280/731 |
| 2003/0227159 | A1 * | 12/2003 | Muller .......................... | 280/731 |
| 2006/0244251 | A1 * | 11/2006 | Muller .......................... | 280/777 |
| 2007/0029771 | A1 * | 2/2007 | Haglund et al. .............. | 280/775 |
| 2007/0046003 | A1 * | 3/2007 | Mori et al. .................... | 280/731 |
| 2007/0046013 | A1 * | 3/2007 | Bito .............................. | 280/777 |
| 2007/0241548 | A1 * | 10/2007 | Fong ............................. | 280/777 |

FOREIGN PATENT DOCUMENTS

| | | |
|---|---|---|
| DE | 38 03 401 | 8/1989 |
| DE | 42 25 671 | 2/1994 |
| DE | 43 22 925 | 1/1995 |
| DE | 198 44 412 | 7/1999 |

(Continued)

*Primary Examiner* — Ruth Ilan
*Assistant Examiner* — Barry Gooden, Jr.
(74) *Attorney, Agent, or Firm* — Henry M. Feiereisen LLC

(57) ABSTRACT

A motor vehicle includes an instrument panel, a steering column defining a longitudinal axis, and a steering wheel arranged on the steering column in a region of the instrument panel. The steering wheel is configured for movement in relation to the instrument panel in a direction of the longitudinal axis towards the instrument panel from a first position to a second position. The steering column is also constructed to enable the steering wheel to move from the second position to the first position when the motor vehicle is subjected to a force caused by an accident.

15 Claims, 4 Drawing Sheets

(56) References Cited

FOREIGN PATENT DOCUMENTS

| DE | 199 07 360 | 8/2000 |
| DE | 100 53 182 | 5/2001 |
| DE | 101 37 971 | 2/2003 |
| DE | 102006006995 | 8/2007 |
| WO | WO 00/58132 | 10/2000 |
| WO | WO 2005/030558 | 4/2005 |

* cited by examiner

MOTOR VEHICLE WITH RETRACTABLE STEERING WHEEL

CROSS-REFERENCES TO RELATED APPLICATIONS

This application claims the priority of German Patent Application, Serial No. 10 2012 014 762.7, filed Jul. 25, 2012, pursuant to 35 U.S.C. 119(a)-(d), the content of which is incorporated herein by reference in its entirety as if fully set forth herein.

BACKGROUND OF THE INVENTION

The present invention relates in general to the field of motor vehicles.

The following discussion of related art is provided to assist the reader in understanding the advantages of the invention, and is not to be construed as an admission that this related art is prior art to this invention.

Motor vehicles are increasingly equipped with "steer-by-wire" steering systems, involving a mechanical or hydraulic decoupling of steering wheel or steering column and wheels of the vehicle. "Steer-by-wire" technology not only decreases weight by doing away with many mechanical components of the steering device but also provides for a so-called autopilot. The presence of an autopilot enables a piloted driving of the vehicle so that the driver no longer has to actively steer the vehicle. Piloted driving enables the driver to attend to other things while the vehicle is travelling and thus allows the driver to travel in a relaxed and trouble-free manner.

Vehicles are known with a steering wheel that can be retracted into an instrument panel or dashboard so as to provide more space for the driver. A retraction of the steering wheel makes it however necessary to alter an airbag system on the driver side, similar to the airbag system on the passenger side, because the airbag which is normally incorporated in the steering wheel would be too small to protect the driver when the steering wheel is retracted. Proposals have been made to provide an airbag not only in the steering wheel but also in the dashboard. In the event of a crash, either the airbag of the steering wheel is deployed, when the driver steers the vehicle by hand, or the airbag arranged in the dashboard is deployed in the event of piloted travel. This proposal has shortcomings because the dashboard becomes bulkier and because of the requirement to provide two airbags on the driver side when the vehicle is equipped with retractable steering wheel.

It would therefore be desirable and advantageous to address this problem and to obviate other prior art shortcomings.

SUMMARY OF THE INVENTION

According to one aspect of the present invention, a motor vehicle includes an instrument panel, a steering column defining a longitudinal axis, and a steering wheel arranged on the steering column in a region of the instrument panel, the steering wheel configured for movement in relation to the instrument panel in a direction of the longitudinal axis towards the instrument panel from a first position to a second position, the steering column being constructed to enable the steering wheel to move from the second position to the first position when the motor vehicle is subjected to a force caused by an accident.

The present invention resolves prior art problems by returning the steering wheel from the retracted position to the position for steering by hand; when a force, caused by an accident, is imposed on the vehicle. As a result, only one airbag is needed for the driver side as the steering wheel assumes a position that enables the airbag in the steering wheel to provide appropriate protection for the driver. This first position, also called crash position of the steering wheel, enables integration of the driver into the overall restraint system of the vehicle in a much better and quicker way.

According to another advantageous feature of the present invention, the motor vehicle may have a control device capable of causing the movement of the steering wheel in the event of an incident. Advantageously, a crash sensor may be operably connected to the control device to produce a signal in response to a crash to cause the steering wheel to move out.

When referring to a situation in which the motor vehicle is subjected to a force in the event of an accident so as to enable the steering wheel to move from the second position to the first position involves also the moment prior to the actual crash. Currently available emergency brake assist systems are sophisticated enough to recognize with very high probability crash-based force impacts through use of a sensor unit so that the situation of an imminent crash and accompanying force impact is covered as well. In other words, the steering wheel moves to the crash position not only when the crash has in fact occurred but also already beforehand, when the sensor unit has detected that as a result of satisfying at least one parameter, a crash is imminent.

According to another advantageous feature of the present invention, the steering column can be constructed to enable a movement of the steering wheel from the second position to the first position within a time interval which advantageously corresponds to a time required for at least partial deployment of an airbag integrated in the steering wheel. As a consequence, integration of the driver and the restraint system can be implemented in an optimum manner because as the steering wheel moves out to assume the so-called crash position, the distance between a fixed abutment and the driver can be shortened in a driving position. The time interval may also correspond to a time in which a person covers a distance from a driving position to a crash position with at least partial deployment of an airbag of the steering wheel.

According to another advantageous feature of the present invention, the time interval may be one tenth of a second or less, advantageously within 10 to 100 milliseconds. Currently preferred is a time interval for moving the steering wheel from the second position to the first position within 20 to 50 milliseconds. This represents substantially the time which an airbag in the steering wheel requires for deployment.

According to another advantageous feature of the present invention, an actuator can be coupled to the steering column and configured to move the steering wheel from the second position to the first position. The provision of an actuator enables a movement of especially the steering wheel in a very short time to the desired position in which the steering wheel forms an abutment for the airbag as the driver plunges into the airbag. The actuator is thus able to move the steering column longitudinally in shortest possible time out of the instrument panel.

According to another advantageous feature of the present invention, the actuator may include a spring device which is maintained under tension when the steering wheel assumes the second position and is constructed for release in the event of an accident. When maintained under tension, a spring device has kinetic energy sufficient to move the steering column to the crash position in the event of an accident. The provision of a spring device requires only its release when the vehicle is involved in an accident but nothing else in form of any further external energy that needs to be introduced. The crash position corresponds substantially to the position of manual steering.

According to another advantageous feature of the present invention, the actuator may include a pyroelement to effect the movement of the steering wheel from the second position to the first position. Similar to the mechanism to deploy an airbag, implementation of the actuator in the form of a pyroelement has the benefit that the rapid propulsion of the steering column out of the instrument panel takes about the same time as the deployment of an airbag.

According to another advantageous feature of the present invention, the actuator may include an electric motor, e.g. a linear motor, which is connected with the steering column in the direction of the longitudinal axis. A linear motor is easily capable to move the steering column along its longitudinal extent out of the instrument panel. The steering column may hereby have at least one coil which can be moved by magnets arranged to the side of the steering column.

According to another advantageous feature of the present invention, the actuator may include a pneumatic cylinder and/or a hydraulic cylinder. For that purpose, the steering column may be designed as piston of the cylinder and pushed out of the cylinder in the event of the accident by hydraulic fluid or gas contained in the cylinder.

According to another advantageous feature of the present invention, a locking device can be provided in a region of the steering column to secure the steering column in an end position, in particular the position of manual steering. As a result, the airbag has a solid abutment in the crash position of the steering wheel. It may also be advantageous to lock the steering column so as to prevent the steering column to yield when the driver impacts the airbag.

According to another advantageous feature of the present invention, at least part of the steering column may be constructed for resilient support. The steering column is able to absorb impact energy of the driver upon the steering wheel when giving way in longitudinal dimension. The steering column may be configured to move a defined distance to thereby enable a better integration of the driver in the restraint system.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
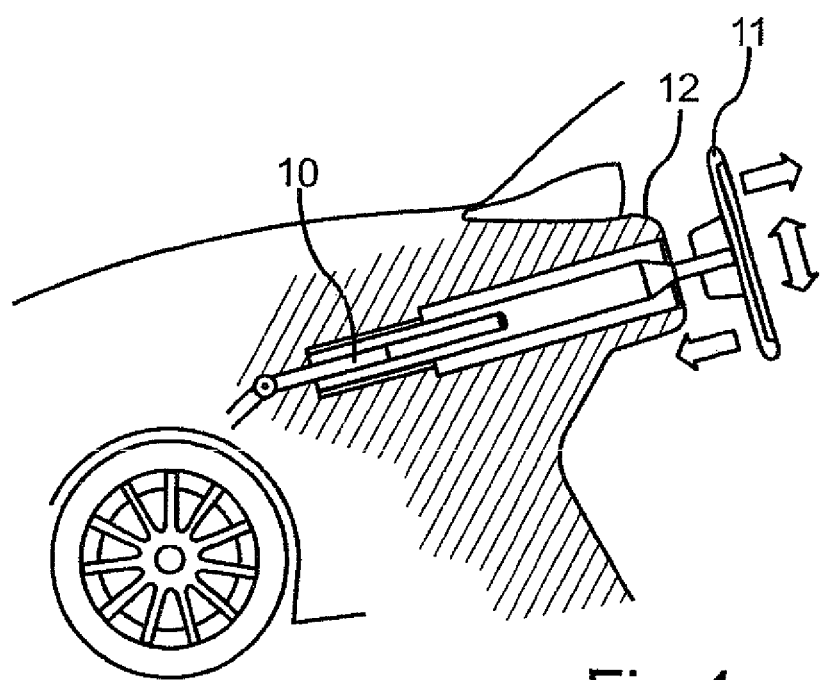
FIG. 1 is an exemplary side view of a steering column arrangement in a front region of motor vehicle in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an exemplary side view of a steering column arrangement in a front region of motor vehicle in accordance with the present invention. The steering column arrangement includes a steering column 10 and a steering wheel 11 mounted to the steering column 10. The vehicle is steerable in an electric manner. Such a "steer-by-wire" steering system is intended to do away with mechanical or hydraulic control. Still, safety concerns require the presence of a purely mechanical or hydraulic coupling of the steering wheel 11 with a steering shaft or steered wheels. Benefits of "steer by-wire" technology include weight savings because the need for a steering linkage can be substantially eliminated and piloted driving of the vehicle is much easier to executer. A motor provided for steering the wheels can be arranged in the region of the wheels or suspension, with each wheel controllable individually by its own motor. Despite these benefits, regulations still require the provision of a mechanical or hydraulic coupling between steering wheel and wheels.

During piloted driving, the steering wheel 11 is actually no longer needed and is retracted in a dashboard or instrument panel 12. The position of the steering wheel 11 can be adjusted in relation to the driver and his or her driving position in vertical direction and in a direction longitudinally along the steering column 10, as indicated by the arrows.

Retracting the steering wheel 11 in the dashboard 12 involves a shifting of the steering wheel 11 in the direction of the dashboard 12 until the steering wheel 11 substantially rests on or is arranged at least in a region of the dashboard.

When the driver operates the vehicle in auto mode, i.e. the vehicle is operated and steered in the absence of an active steering by the driver, the driver can retract the steering wheel 11. This position is commensurate with automatic steering and is designated also as "second position" or "automatic position", whereas the position of active or manual steering is designated as "first position", also called "crash position", of the steering wheel 11. The driver at first steers the vehicle by hand and then changes in a next step to the mode of automatic steering. Automatic steering does not require any active intervention by the driver so that the steering wheel 11 has no actual use at this point. So as to free up more space for the driver, the steering wheel 11 is retracted in the second position by shifting the steering wheel 11 towards the dashboard 12.

In the second position, the steering wheel 11 is advantageously in a neutral position in which the wheels, when mechanically coupled with the steering wheel 11, are positioned for driving straight ahead. In the second position, the steering wheel 11 and advantageously also the steering column 10 are decoupled from a steering operation in a "steer-by-wire" mode, i.e. the steering wheel 11 does not turn, even when the wheels are turned.

The steering wheel 11 is equipped with an airbag (not shown) in a manner known per se. In the event of an accident, the airbag is deployed by shooting out of the steering wheel 11 to protect the driver. When the vehicle operates in the auto-mode and the steering wheel 11 is thus retracted, a deployment of the airbag is accompanied by a movement of the steering wheel 11 from the retracted position into another predefined position, so that the airbag is not arranged too distanced from the driver. The predefined position substantially corresponds to the first position in which the vehicle is actively steered and represents the crash position. The steering wheel 11 is moved hereby at a great speed into the crash position in the event of an accident, in particular in the event of a head-on collision. This movement should be executed very rapidly, advantageously at a same speed as the deployment of the airbag or rapidly enough so that the crash position is reached when the driver plunges into the at least partly deployed airbag. The projecting steering wheel 11 enables a faster and better integration of the driver to a restraint system of the vehicle, so that energy can be absorbed in a better way in order to improve protection of the driver.

As the steering wheel 11 is moved from the second retracted position to the first crash position in the event of an accident, the vehicle can be equipped with a crash detection system or emergency brake assist system which is able to recognize through use of a sensor unit the presence of an impending collision. Structure and operation of such crash detection systems are generally known so that further description thereof is omitted for the sake of simplicity. The crash detection system is able to recognize with high probability an imminent accident. For that purpose, the sensor unit is configured to monitor one or more parameters, on the basis of which the presence of an impending accident can then be determined. When detecting an imminent crash, the steering column 10 with the steering wheel 11 can be prepared for this collision and shifted earlier to the crash position. As a result, precious time can be gained.

The steering wheel 11 is thus configured for prompt movement to the predefined position so as to be able to integrate the driver into the restraint system. A time interval in the range of tenths of a second or even in the milliseconds range is realized. In other words, the steering wheel 11 can be transferred in few milliseconds from the retracted position to the crash position.

The steering column 10 is hereby operably connected to an actuator provided to extend the steering column 10 within the predefined time interval in the event of an accident and to move the steering wheel 11 into the position of manual steering. The actuator can be configured in many ways to apply the necessary force in order to rapidly extend the steering column 10. The actuator is advantageously connected with an extendible member of the steering column 10 so that this member is moved out of the dashboard 12. It is also conceivable to provide the steering column 10 as part of the actuator.

As described above, the steering column 10 can be integrated in an emergency brake system. This means that the actuator has more time available for moving the steering wheel 11 from the second position into the first position compared to the time required for the deployment of the airbag because the steering wheel 11 can be moved before the actual occurrence of the accident when the sensor unit has actually detected a deformation of the vehicle as a result of a force impact caused by a crash.

Figure 2:
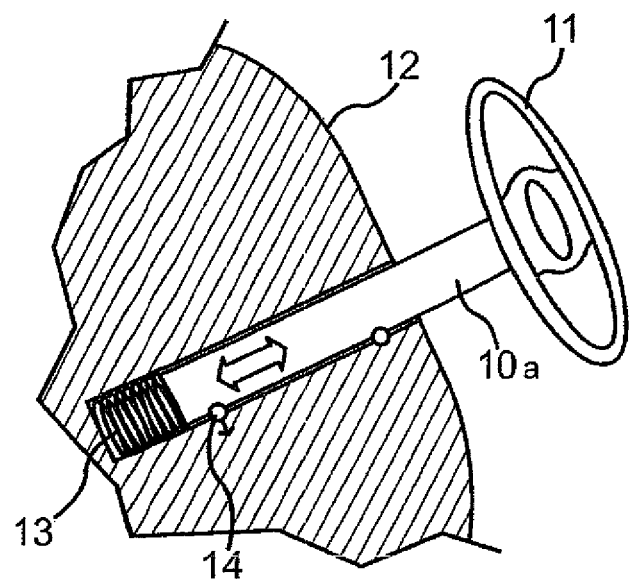
FIG. 2 is a side view of a first embodiment of a steering column.
Figure 5:
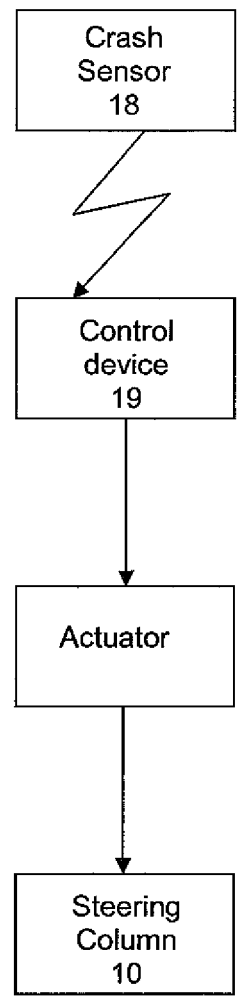
FIG. 5 is a block diagram showing a relationship between components of the steering column arrangement.

FIG. 2 shows a side view of a first embodiment of a steering column, designated by reference numeral 10a. Parts corresponding with those in FIG. 1 are denoted by identical reference numerals and not explained again. In this embodiment, provision is made for an actuator which is essentially configured as a spring element 13 that is maintained under tension when the steering wheel 11 assumes the second position. A kinetic energy contained in the spring element 13 is sufficient to propel the steering wheel 11 in few milliseconds to the desired position. As the steering wheel 11 is shifted to the second position, the spring element 13 is tensioned. As depicted in FIG. 2 by way of example, the steering column 10 compresses hereby the spring element 13 which is locked in this position by a locking device 14 and thereby maintained under tension. Release of the spring element 13 is advantageously realized electromagnetically via a control device 19 (FIG. 5) which may also be used for deployment of the airbag. The locking device 14 has advantageously a solenoid to enable a rapid release of the locked position of the spring element 13. Once the locked position is released, the spring element 13 pushes the steering column 10 with the steering wheel 11 into the desired position of manual steering in which the driver impacts the airbag.

As soon as the steering wheel 11 has been propelled to the desired (first) position, the steering column 10 is locked to allow absorption of energy generated by the driver when plunging into the airbag. Securing the steering column 10 in the first position renders the steering column 10 substantially immobile in its length dimension in the dashboard 12 to thereby provide an adequate abutment for the airbag.

Figure 3:
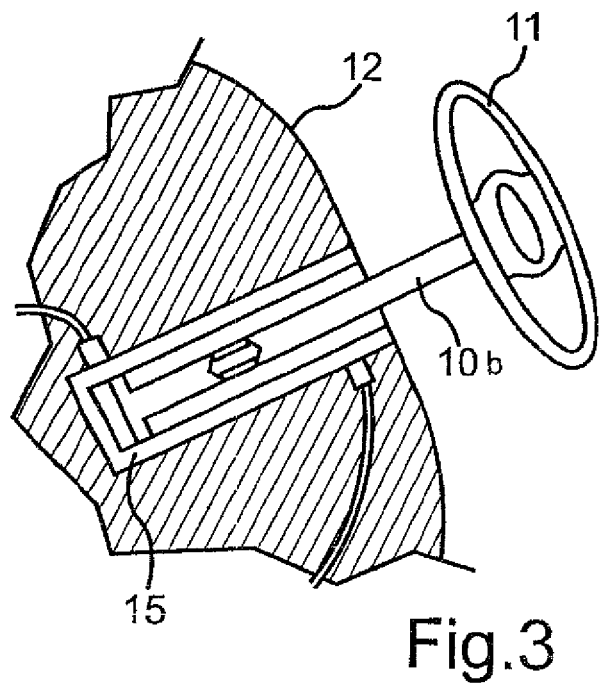
FIG. 3 is a side view of a second embodiment of a steering column.

FIG. 3 shows a side view of a second embodiment of a steering column 10b in which the actuator is configured in the form of a control element, advantageously as pneumatic or hydraulic cylinder 15. The pneumatic or hydraulic cylinder 15 has typically a gas or hydraulic reservoir for storing a gas or hydraulic fluid. In the event of an accident, the pneumatic or hydraulic cylinder 15 causes the attached steering column 10 to extend out of the dashboard 12, with the steering column 10 advantageously be constructed as piston of the pneumatic or hydraulic cylinder 15. Of course, the steering column 10b may also be moved by a separate piston of the pneumatic or hydraulic cylinder 15. A pressure force of the pneumatic or hydraulic cylinder 15 is dimensioned to enable propulsion of the steering wheel 11 from the second position to the first position within the required time. The need for a separate locking device can be dispensed with as a result of the pressure prevailing in the cylinder 15

Figure 4:
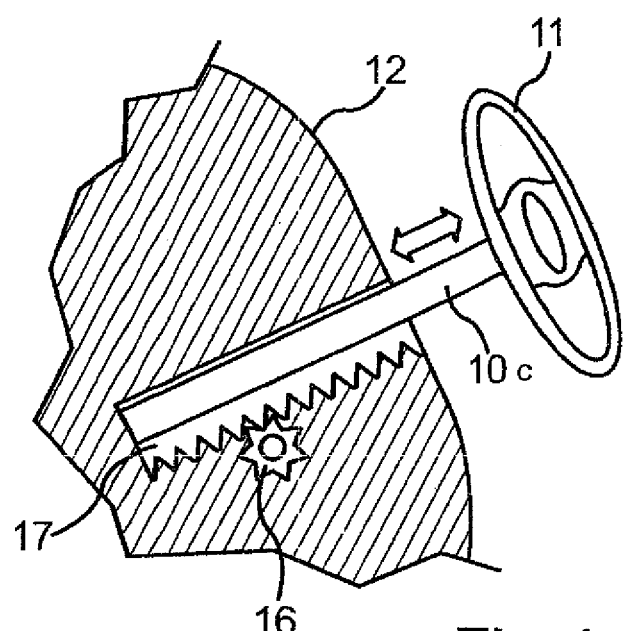
FIG. 4 is a side view of a third embodiment of a steering column.

FIG. 4 shows a side view of a third embodiment of a steering column 10c in which the actuator is configured as an electric motor arranged in the region of the steering column 10c. The electric motor has a shaft which is connected to a pinion 16 in mesh with a toothed rack 17 which is arranged on the steering column 10c. In the event of an accident, the electric motor is activated to enable the steering column 10c to move to the first position as a result of a rotation of the pinion 16. In this position, the steering column 10c can be locked in place by locking the electric motor.

The electric motor can constructed as a linear motor arranged along the steering column 10c. The linear motor is activated in the event of an accident so that the extendible member of the steering column 10c can be moved in relation to a fixed member of the steering column 10c. Also in this variation, there is no need for the presence of a separate locking device to lock the steering column 10 in place when the desired position has been reached. The steering column 10c can be held in the desired position by the electric voltage. Of course, a separate locking device may still be provided as additional safety feature.

The actuator may also be configured as a pyroelement by which the moving member of the steering column 10 is extended in the event of an accident. Like a pyroelement of an airbag, the pyroelement of the steering column 10 propels the moving member into the desired position. As soon as the steering wheel 11 has reached the desired position, the steering column 10 is locked in place again to provide an adequate abutment for the airbag.

Operation of some of the actuators require energy in the event of an accident so that the actuator is advantageously provided with its own energy store. This may be realized for example in the form of a capacitor which stores sufficient energy to supply the electric motor or a pump of the pneumatic or hydraulic cylinder 15 with energy. Operation of the actuator is therefore independent from the on-board electrical power supply which is susceptible to damage especially in the event of a serious accident.

In addition, the actuator is connected with a crash sensor 18 which is operably connected to the control device 19 and generates a signal when the vehicle is involved in an accident, e.g. head-on collision. The crash sensor 18 and the control device 19 are configured such that the presence of a signal causes the steering column 10 to extend or the steering wheel 11 to move from the second position to the first position.

In addition to the locking feature, the steering column 10 may also be constructed to have a least a compliant part which yields when exposed to impact energy. As a result, the steering column 10 shifts at least in part in its length dimension. When the actuator is configured as a linear motor or a pneumatic or hydraulic cylinder, a combination with the compliant part of the steering column 10 is possible. The force applied by these actuators upon the steering column 10 is dimensioned to permit the movement of the steering column 10 by the impact energy.

As described above, the steering column 10 can be locked with one part after being moved to the respective position, and can still be configured compliant with another part so as to render a combination of both systems possible.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A motor vehicle, comprising:
   an instrument panel;
   a steering column defining a longitudinal axis; and
   a steering wheel arranged on the steering column in a region of the instrument panel, said steering wheel configured for movement in relation to the instrument panel in a direction of the longitudinal axis towards the instrument panel from a first position to a second position when the motor vehicle is operated in auto mode without active steering by a driver,
   said steering column being constructed to enable the steering wheel to move in relation to the instrument panel in the direction of the longitudinal axis away from the instrument panel from the second position to the first position when the motor vehicle is subjected to a force caused by an accident.

2. The motor vehicle of claim 1, further comprising a control device capable of causing the movement of the steering wheel in the event of the accident, and a crash sensor operably connected to the control device and capable of triggering a signal to alert the control device to move the steering wheel from the second position back to the first position.

3. The motor vehicle of claim 1, wherein at least part of the steering column is constructed for resilient support.

4. The motor vehicle of claim 1, wherein the steering column is constructed to enable the movement of the steering wheel from the second position to the first position within a time interval which corresponds to a time required for at least partial deployment of an airbag integrated in the steering wheel.

5. The motor vehicle of claim 4, wherein the time interval is one tenth of a second or less.

6. The motor vehicle of claim 4, wherein the time interval is within 10 to 100 milliseconds.

7. The motor vehicle of claim 4, wherein the time interval is within 20 to 50 milliseconds.

8. The motor vehicle of claim 1, further comprising an actuator coupled to the steering column and configured to move the steering wheel from the second position to the first position.

9. The motor vehicle of claim 8, wherein the actuator includes a spring device which is maintained under tension when the steering wheel assumes the second position and constructed for release in the event of the accident.

10. The motor vehicle of claim 8, wherein the actuator includes a pyroelement.

11. The motor vehicle of claim 8, wherein the actuator includes an electric motor which is connected with the steering column in the direction of the longitudinal axis.

12. The motor vehicle of claim 8, wherein the actuator includes a pneumatic cylinder or a hydraulic cylinder.

13. The motor vehicle of claim 1, further comprising a locking device provided in a region of the steering column and capable of securing the steering column in an end position.

14. The motor vehicle of claim 13, wherein the end position is the first position.

15. The motor vehicle of claim 13, wherein the end position is the second position.

* * * * *